United States Patent [19]
Vaughn et al.

[11] Patent Number: 5,643,088
[45] Date of Patent: Jul. 1, 1997

[54] GAME OF SKILL OR CHANCE PLAYABLE BY REMOTE PARTICIPANTS IN CONJUNCTION WITH A COMMON GAME EVENT INCLUDING INSERTED INTERACTIVE ADVERTISING

[75] Inventors: Eric E. Vaughn, Sunnyvale; Mark K. Berner, Santa Clara, both of Calif.

[73] Assignee: Interactive Network, Inc., Sunnyvale, Calif.

[21] Appl. No.: 454,925

[22] Filed: May 31, 1995

[51] Int. Cl.$^6$ ....................................... A63F 9/24
[52] U.S. Cl. ............................. 463/40; 463/41
[58] Field of Search ................. 463/40, 41, 42, 463/16, 9, 7; 364/411; 273/439, 433, 138 A, 85 G, 85 CP

[56] References Cited

U.S. PATENT DOCUMENTS

| | | |
|---|---|---|
| 4,592,546 | 6/1986 | Fascenda et al. . |
| 5,035,422 | 7/1991 | Berman . |
| 5,073,931 | 12/1991 | Audebert et al. . |
| 5,083,271 | 1/1992 | Thacher et al. . |
| 5,213,337 | 5/1993 | Sherman . |
| 5,227,874 | 7/1993 | Von Kohorn . |
| 5,283,734 | 2/1994 | Von Kohorn . |
| 5,343,239 | 8/1994 | Lappington et al. . |
| 5,462,275 | 10/1995 | Lowe et al. . |

*Primary Examiner*—Jessica Harrison
*Assistant Examiner*—Michael O'Neill
*Attorney, Agent, or Firm*—Flehr, Hohbach, Test, Albritton & Herbert

[57] ABSTRACT

A game of skill or chance played simultaneously by several participants remote from each other also provides for interleaved interactive advertising. Each participant has a control unit or a personal computer or processor which can handle the interleaved advertising as a separate computer task which means that the other game task can always continue to operate in the background.

3 Claims, 5 Drawing Sheets

GAME OF SKILL OR CHANCE PLAYABLE BY REMOTE PARTICIPANTS IN CONJUNCTION WITH A COMMON GAME EVENT INCLUDING INSERTED INTERACTIVE ADVERTISING

The present invention is directed to a game of skill or chance playable by remote participants in conjunction with a common game event including inserted interactive advertising.

BACKGROUND OF THE INVENTION

As described in the Lockton et al. U.S. Pat. No. 4,592,546, home television viewers of a football game or other sports events or another type of TV game may play along to predict, for example, the play called by the quarterback and/or, in the case of a quiz game, to guess the correct answer along with the actual player in the TV studio. As described by the above patent, the football game, for example, is received on a normal television receiver and the interactivity with that game is made possible by a second mass communication download to the individual remote participant by either the vertical blanking interval (VBI) of a television signal or an FM (SCA) radio channel.

A major source of income for many entertainment businesses including television, radio and print media is advertising. Television advertisers especially would like to receive immediate feedback on the part of the consumer after watching an ad with a minimum of effort. Some of the feedback might involve an answer to a survey conducted by the advertiser, a quiz perhaps with a prize to test the impact of the advertisement and, most importantly, the advertiser would like to be able to capitalize on the consumer's impulse by allowing an immediate purchase.

OBJECT AND SUMMARY OF INVENTION

It is, therefore, a general object of the present invention to provide a game of skill or chance playable by remote participants in conjunction with a common game event including inserted interactive advertising.

In accordance with the above object, there is provided a game of skill or chance played simultaneously by several participants remote from each other in conjunction with at least one common game where interactive advertising is inserted into the game.

Communication means provide to each participant the common game along with interactive advertising. Control unit means associated with each remote participant receive game and interactive ad inputs by such participant including keyboard means and a visual display. The control unit means includes a game data stream and an interactive ad data stream which may be selectively associated with the keyboard means and visual display. Central computer system means transmit and download game messages and interactive ad messages to all of the control unit means and receive uploaded game data and interactive ad data from the control unit means which are related to the inputs, the control unit means continuing to process both of said interactive ad and game messages on said respective data streams irrespective of which data stream said keyboard means and said display are associated with.

DETAILED DESCRIPTION OF THE PREFERRED EMBODIMENT

Figure 1:
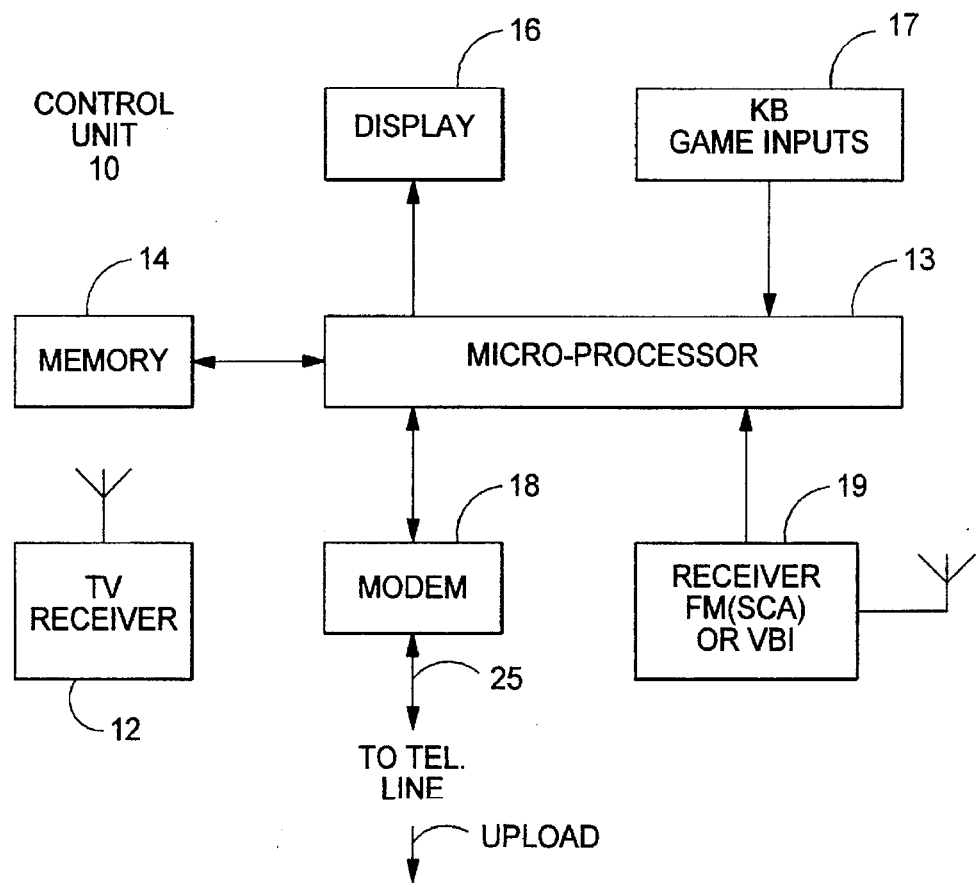
FIG. 1 is a block diagram of a participant control unit embodying the present invention.

FIG. 1 illustrates a control unit 10 which is useable and located at the location of each of the remote participants for playing a game of skill or chance; for example, football, baseball, a television game such as Wheel of Fortune or Jeopardy, or an offline specialized game specifically directed to the player or customer via the mass communication's channel provided by an FM (SCA) channel or vertical blinking interval (VBI) of a television signal or other link such as cable.

Figure 2:
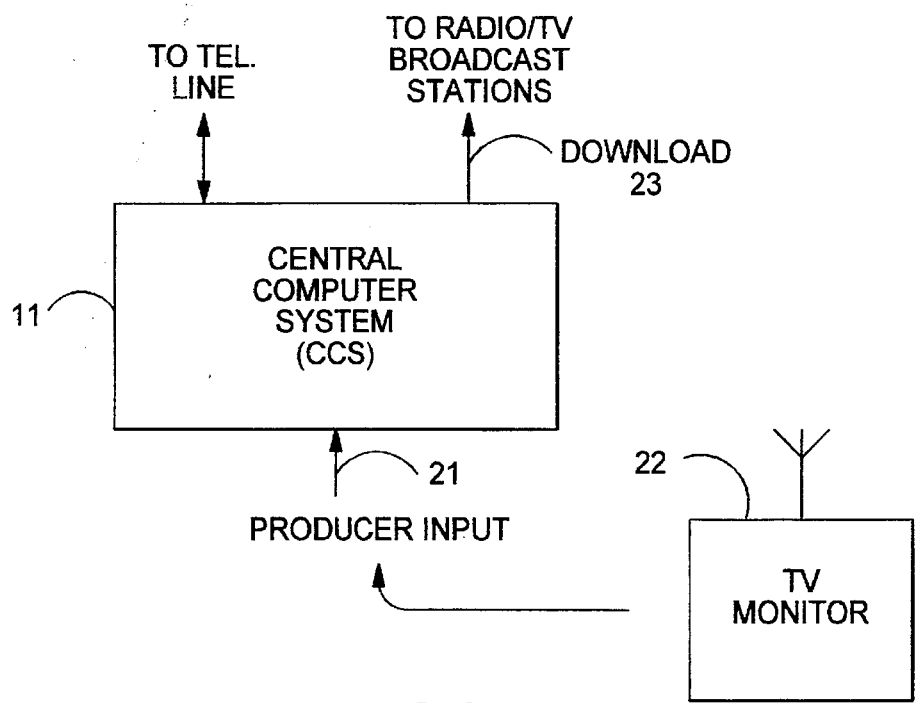
FIG. 2 is a block diagram of the central computer system embodying the present invention.

Very briefly, referring to FIG. 2, the central computer system (CCS) supervises and controls both the overall game and any interactive advertising.

In general, the present invention is applicable to any type of game of skill or chance or contest which is communicated to the local participant or user by a standard television signal, cable, satellite or other transmission technique. In one specific example as illustrated in FIGS. 1 and 2, which at the present time is believed to be the most typical, the participant with their central control unit 10 would have associated with it at their location a television receiver 12 which, for example, is receiving a football game. The control unit 10 which may be a separate unit or a part of the user's personal computer or a set-top box on the TV receiver 12 includes a microprocessor 13 having a memory 14, a display 16 (either liquid crystal or a cathode ray tube display) and a keyboard game input unit 17 which in addition to the keyboard might include joy stick controls, a mouse or other type of inputs. To communicate with the outside world, microprocessor 13 is linked to the telephone system via a modem 18 and to wireless communications such as VBI or FM (SCA) by the receiver 19.

Referring to FIG. 2, a game contest is controlled by the central computer system 11 which has a producer input 21 and for use by the producer a TV monitor 22. Specifically, by way of example, from a game standpoint as a football game is being monitored with the TV monitor 22 by the producer and the game of skill involves predicting the play that the quarterback calls, then the producer input 21 would provide a lockout signal downloaded, indicated by the line 23, via VBI or the FM (SCA) receiver 19 to prevent the player or participant at the control unit 10 from making a late prediction.

More importantly, the producer also controls the insertion of advertising information into any event, either a live television event or a offline event which is also being downloaded on line 23. When the common event is aired, the interactive advertisement data is synchronized with the on-air event by the human producer (or programmed control). The advertising may be either on the participant's TV receiver 12 or on the display 16. In general, the advertisement may merely provide information, may allow the user to obtain more detail product information by making a request, may ask the participant or customer questions about the advertising campaign in the nature of a survey, may provide a quiz to the customer to determine the impact of the ad, and finally may allow the customer to immediately purchase the product. This would all be done by the keyboard input unit 17.

Thus, in summary, communication means provide for each participant a common game of skill or chance along with interactive advertising. These may be routed either along the normal radio, TV broadcast channels or a specialized technique such as the FM (SCA) or, in fact, a two-way cable. Each remote participant has a control unit 10 which receives both the user's game inputs on the keyboard 17 (for example, predicting the quarterback play) and also an interactive ad input as discussed above. The CCS 11 transmits, as will be described below, both game messages and interactive ad messages to all of the control unit means via the download line 23.

Finally, any responses of the participants to questions, requests or purchases are normally stored in memory 14 of the control unit 10 for later upload via the telephone line 25 to the CCS 11. Also, with respect to the play of the associated game, scores and other information, as described in the '546 patent, are uploaded also in the same manner.

Figure 3:
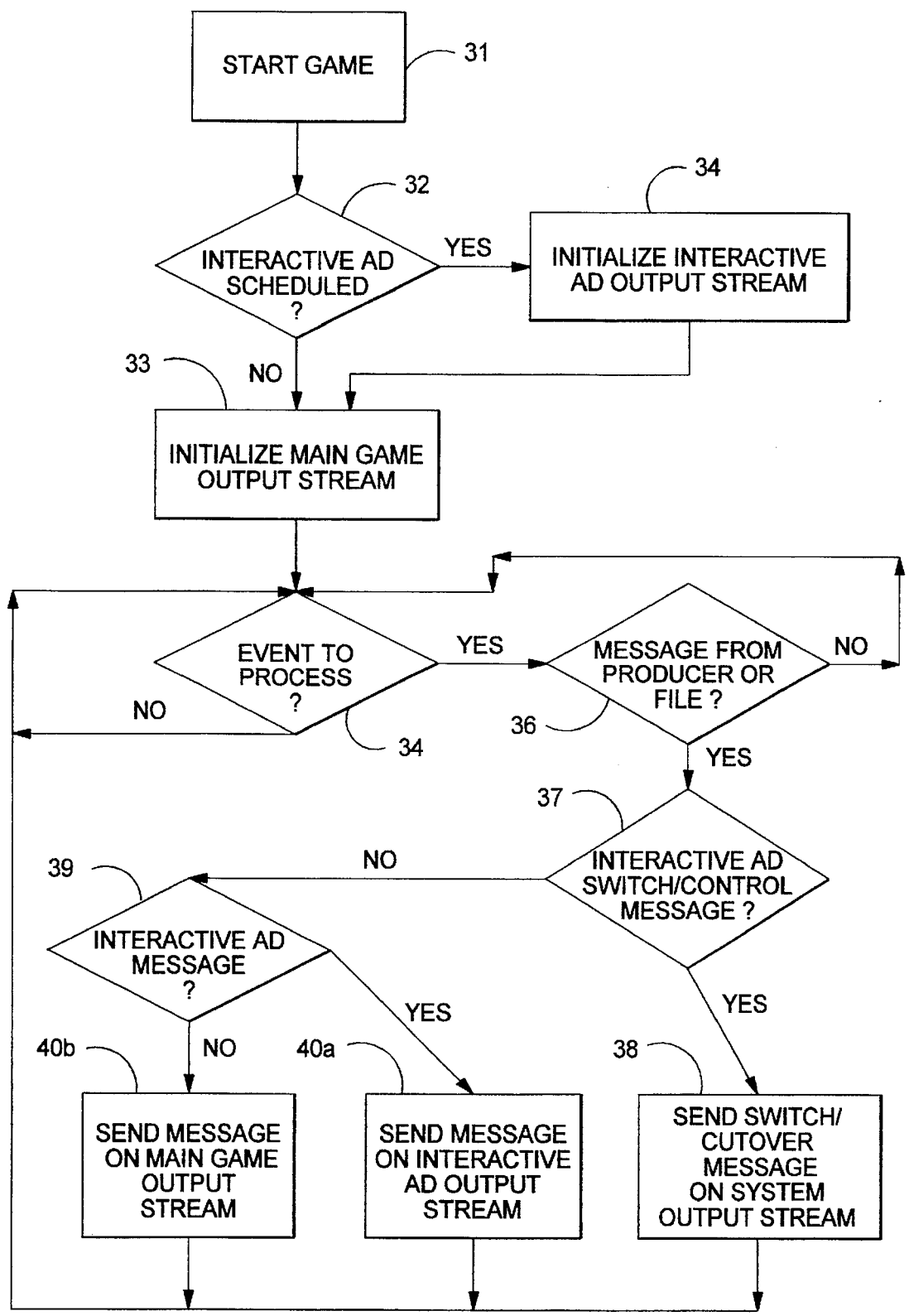
FIG. 3 is a flow chart illustrating the operation of the central computer system of FIG. 2.

FIG. 3 is a flow chart indicating the CCS 11 handling of interactive advertisements when a game starts, as shown in block 31. The question is asked at 32 whether an interactive ad is scheduled. If not, then in block 33 the main game program is initialized for downloading to all control units. If an ad is scheduled, then in block 34 a separate interactive ad data stream program is initialized.

Figure 4:
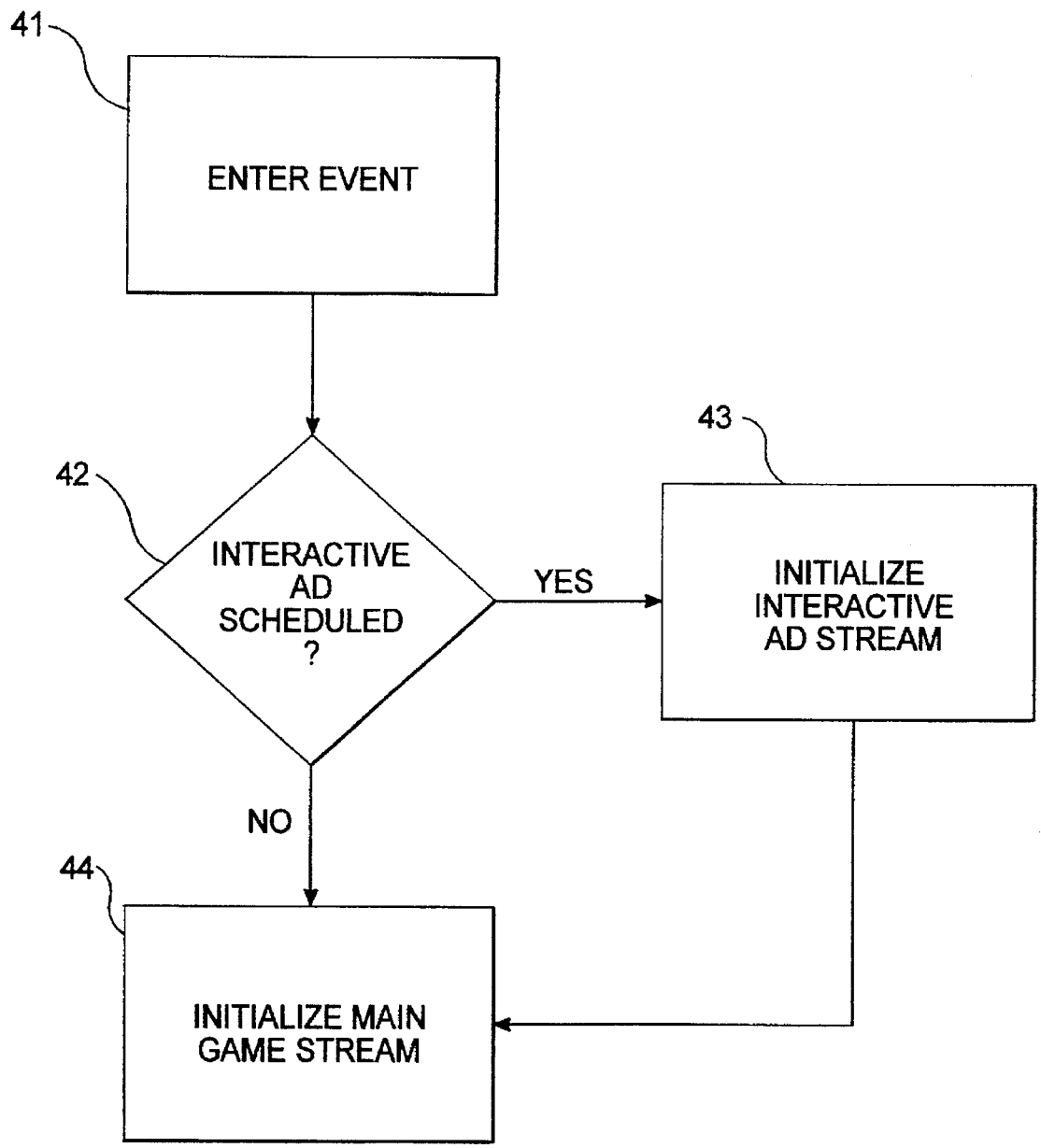
FIG. 4 is a flow chart illustrating the partial operation of the control unit of FIG. 1.

Referring briefly to FIG. 4, which is a flow chart of the control unit 10 initialization, if an event is entered as shown in block 41 then the control unit asks whether an interactive ad is scheduled (block 42). If so, the initialized ad output stream of block 34 of the CCS initializes the interactive ad stream program of the control unit as shown in block 43. Additionally, whichever is the case, the game program is initialized as shown in block 44.

Thus, in summary there is downloaded to each control unit both game and interactive advertising programs effectively before the game starts.

Referring back now to FIG. 3, after all this preloading occurs in step 34 the question is asked whether there is an event to process. If so, as processed by step 36, this event would be a message from the producer or file of the producer which in step 37 asks whether the message involves a switch/control message. Referring to block 38, a switch message is sent to the control unit on a separate system output stream and determines whether the display 16 and keyboard and game input 17 of the control unit are associated with the game being played or the interactive ad.

Referring back to step 37, if it is not a switch message, then block 39 asks whether it is an interactive ad message and, if it is as in block 40a, this message is sent on to the control unit via the interactive ad output stream block 40a; if it is not an interactive ad message meaning it is a game message as shown in block 40b, this is sent on a main game output data stream to the control unit.

Figure 6:
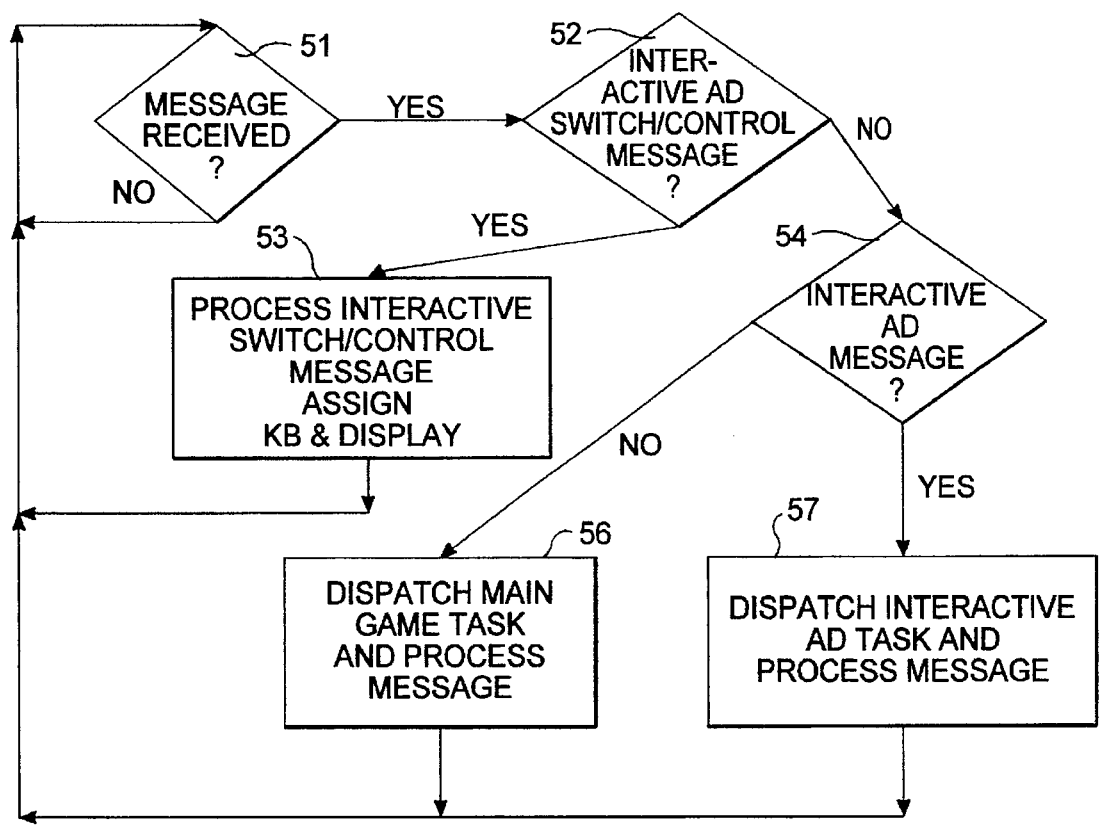
FIG. 6 is a flow chart illustrating another aspect of the operation of the control unit of FIG. 1 as it interfaces with the central computer system of FIG. 2.

FIG. 6 relates to the control unit handling of the switching data stream 38, the interactive ad data stream 40a and the game data stream 40b. In step 51, the question is asked whether a message has been received from the CCS 11. If so, in block 52 the same question as in block 37 of FIG. 3 is asked whether or not it is an interactive ad switch/control message. If yes, then the block 53 actually performs the function of assigning the keyboard and display to the interactive ad function, or the game function. If it is not a switch message as illustrated in block 54 (see also block 39, FIG. 3), then a distinction is made between whether it is an interactive ad message or a game message. If it is a game message, then block 56 takes over and the dispatches the main game task and processes the message. If it is an interactive ad message, then block 57 processes the ad task and processes the message. Such messages as in the case of the game might be a lockout signal, and in the case of an interactive ad would involve questions, quizzes, responses, etc.

Figure 5:
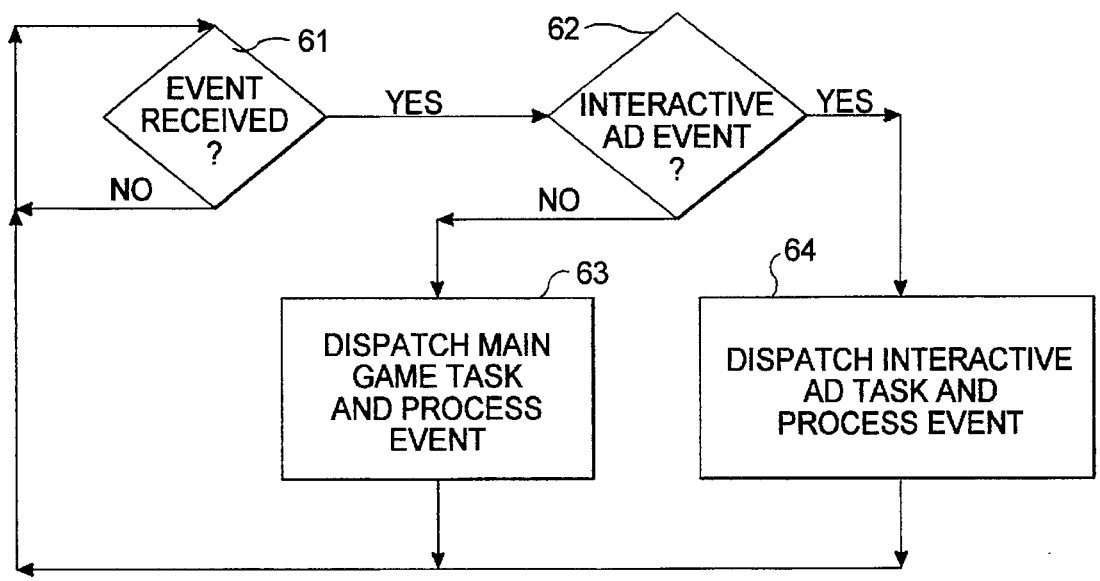
FIG. 5 is a flow chart illustrating the operation of another aspect of the control unit of FIG. 1.

FIG. 5 relates to the control unit implementing the handling of various events where in block 61 the question is asked whether an event has been received. Step 62 distinguishes an interactive ad event and game event and in steps 63 and 64 these events are implemented. The event received 61 is a user input which might be a timeout involving a lockout signal or the user inputting something on the keyboard input 17. Whether or not it is an interactive ad event 62, is determined, of course, by the assignment of the keyboard (see step 53 in FIG. 6) by the switch control message.

Referring to FIG. 6 from a broad standpoint and also FIG. 5, it is obvious that messages being regulated by step 54 and dispatched either for a game in block 56 or an interactive ad 57 will continue simultaneously irrespective of how the keyboard and display are assigned at the participant's control unit. Thus, while one data stream, for example, 40b (see FIG. 3) is affecting the game per se, the other data stream, for example, the interactive ad stream 40a may operate in the background. And, of course, the reverse is true.

Figure 7:
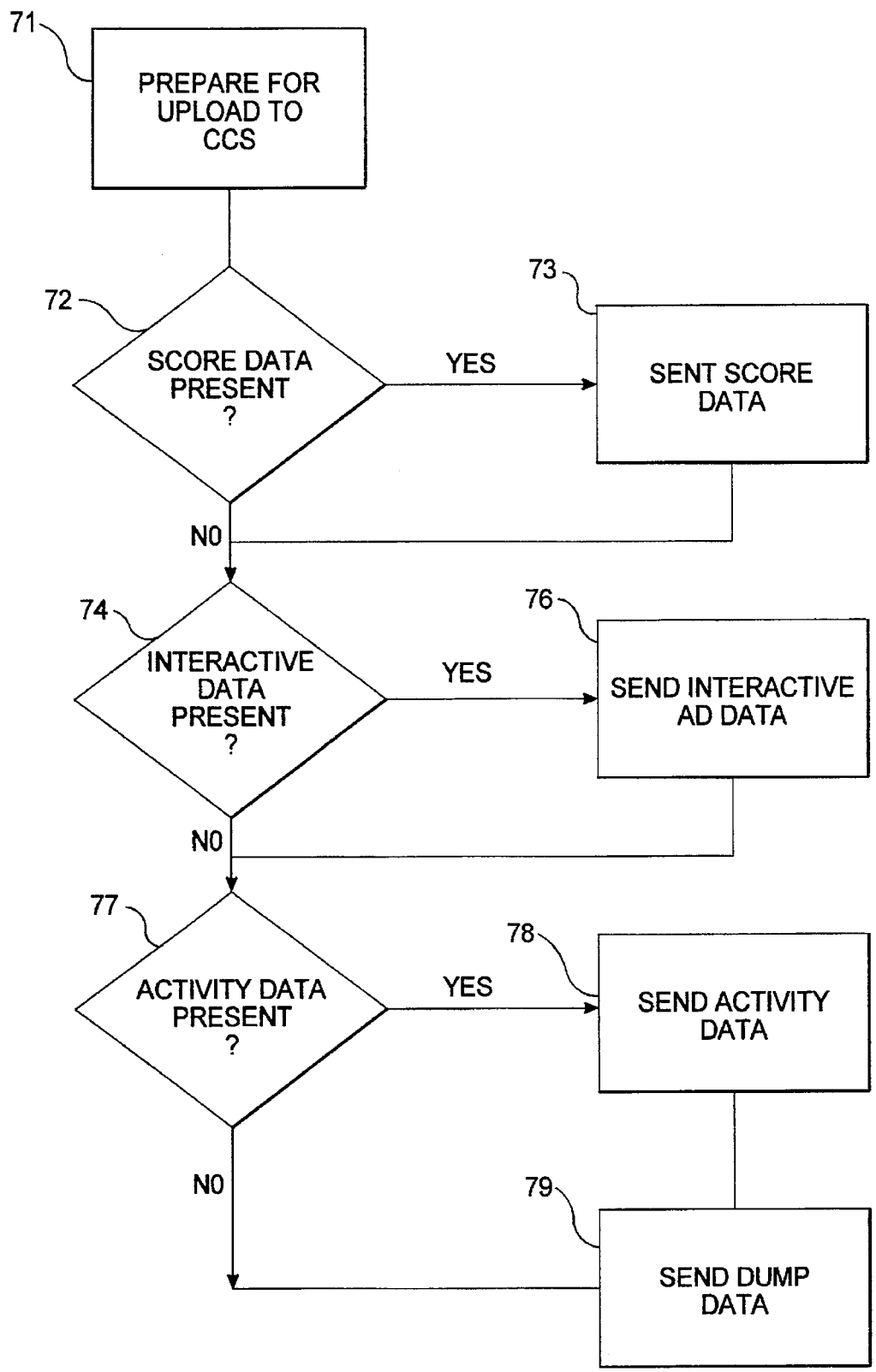
FIG. 7 is a flow chart illustrating the uploading of information from a control unit of FIG. 1 to the central computer system of FIG. 2.

Finally, in FIG. 7 is the uploading of all relevant data of the game and interactive advertising from the control unit to the CCS. Thus, block 71 prepares for an upload to the CCS. And, in 72, there is asked whether game score data is present and, if so, this is sent in 73. Next, whether interactive ad data, in block 74, is present and, if so, this is sent in block 76. Lastly, whether any general activity data involving the user's control unit needs to be sent and this is done in 78. Finally, if no data is to be sent, or the remainder of the data has been sent, then block 79 dumps the data.

Thus, to summarize, once the interactive advertising data has been processed by the CCS into a downloadable data file, the game event is scheduled and flagged as having an interactive advertisement. As the event starts or just before, the CCS categorizes data input files and producer connections as either the main game or interactive advertisement data sources and these are downloaded; separate data streams are provided for each.

In the control unit, the interactive advertisement is in a different data stream and it is handled by a different application program than the main game event. In other words, since the interactive advertisement functionality is contained in its own separate program, it does not need to be built into the main game application. This minimizes the size and complexity of all of the programs involved and allows for consistent interactive advertising interface regardless of what game application or other type of main event the advertisement is inserted into. To state this in another way, the operating system in the control unit handles the main game and the interactive advertisement as separate tasks.

A third system data stream 38 determines the "ownership" of the resources of the display and the keyboard. This ownership is determined when the switch message is received. However, both the interactive ad and the main game task continue to be received and messages and events are processed regardless of the ownership of the screen and keyboard. This allows the "background" application to continue running, even when the other application has an ownership of the screen and keyboard resources. Moreover, this control is available to the central computer system and the producer unlike a "windows" type program which is under the control of the specific user.

The resulting benefit of the foregoing allows the interactive advertisement to be flexible enough to accurately and effectively target customers. In addition, immediate purchase of the item can be provided.

What is claimed is:

1. A game of skill or chance played simultaneously by several participants remote from each other in conjunction with at least one common game where interactive advertising is inserted into the game comprising:

communication means for providing to each participant said common game along with said interactive advertising;

control unit means associated with each remote participant for receiving game and interactive ad inputs by such participant said control unit means including keyboard means and a visual display said control unit means including a game data stream and an interactive ad data stream which may be selectively associated with said keyboard means and visual display;

central computer system means for transmitting and downloading game messages and interactive ad messages to all of said control unit means and for receiving uploaded game data and interactive ad data from said control unit means which are related to said inputs, said control unit means continuing to process both said interactive ad and game messages on said respective data streams irrespective of which data stream said keyboard means and said display are associated with; said central computer system means also including means for transmitting an additional switching message for transmission and downloading to said control unit means, said control unit means including a third switching message data stream means for receiving said switching message and in response to such message associating said keyboard means and visual display with a selected game data stream or interactive ad data stream in accordance with said message, the. unselected data stream continuing to process in the background.

2. A game of skill or chance as in claim 1 where said central control system means and said control unit means include means for downloading to said game control unit means interactive advertising programs before said game starts.

3. A game of skill or chance as in claim 1 where said communication means includes a common channel means for downloading both said game and interactive ad messages.

* * * * *